July 20, 1954 H. S. ROSENBAUM 2,683,890
DRAPERY TRAVERSE ROD ASSEMBLY
Filed April 10, 1953
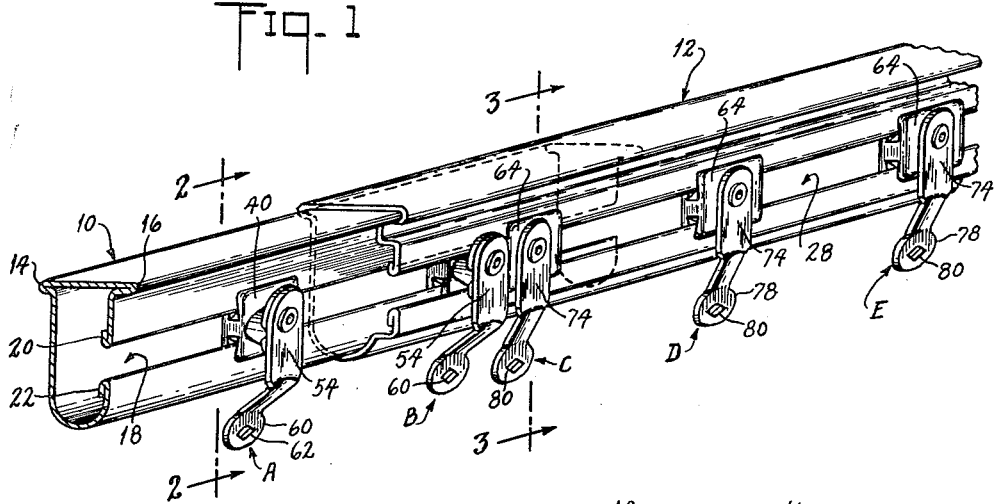
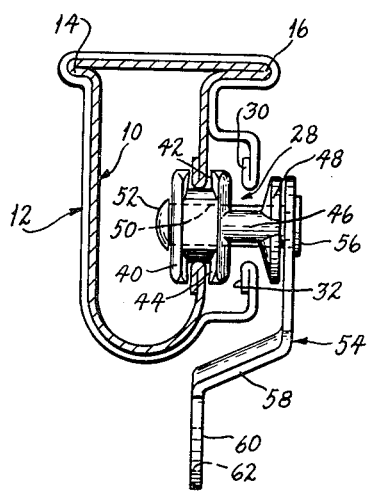
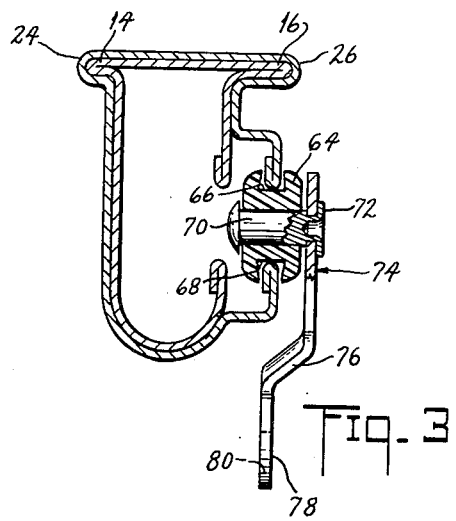

Patented July 20, 1954

2,683,890

UNITED STATES PATENT OFFICE 2,683,890

DRAPERY TRAVERSE ROD ASSEMBLY

Harry S. Rosenbaum, Baltimore, Md., assignor to The Eastern Venetian Blind Company, Baltimore, Md., a corporation of Maryland Application April 10, 1953, Serial No. 347,975

4 Claims. (Cl. 16—87.4)

The present invention relates to a drapery traverse rod and particularly to such a rod which is telescopically adjustable in length and which includes separate tracks on each telescoping member for receiving slides to which the drapery may be attached.

It is an object of the present invention to provide a simple and inexpensive adjustable traverse rod assembly which may be readily adjusted to windows of various widths and may be installed without the application of specialized skill.

In the drawings, there is shown a preferred but not necessarily the only form of the present invention. In said drawings:

Fig. 1 is an isometric view of a portion of a traverse rod constructed in accordance with the present invention;

Fig. 2 is a section along the line 2—2 of Fig. 1; and

Fig. 3 is a section along the line 3—3 in Fig. 1.

Referring now to Fig. 1, generally hollow tubular sections 10 and 12 are shown in telescoping relationship, the view chosen showing only the inner central ends of the sections 10 and 12 and showing them telescoped over a relatively short distance. It will be understood that the sections 10 and 12 may be made of any desired length for attachment to window frames of various widths and that the two members may telescope upon one another to such an extent that a particular pair of telescoping rods may be used in openings varying from a width just slightly greater than the length of one of the telescoping rods to a width just slightly less than twice such length. For the purposes of illustration, it has been assumed that the rods 10 and 12 have been extended to substantially the maximum amount.

The telescoping members 10 and 12 are respectively inner and outer members in the sense that the member 10 is so dimensioned as to be received lengthwise within the member 12. The members 10 and 12 may be made of sheet metal, for example, and may have any suitable cross-sectional shape appropriate for imparting desired strength and rigidity without unnecessary weight. Thus the member 10 may have a flattened tubular shape with the larger dimension extending in the direction in which the load will be applied, as is quite customary in the construction of curtain rods, drapery rods and the like. It is preferred to provide the inner telescoping member 10 with flanges 14 and 16 (see Fig. 2), which may be formed by bending the sheet metal relatively sharply upon itself. A track slot 18 is formed in one wall of the inner telescoping member 10 and the edges 20 and 22 thereof are bent back upon themselves to stiffen the edges of the slot 18 as well as to provide a smooth, rounded track surface for receiving the slides to be described hereinbelow.

The outer telescoping member 12 has substantially the same cross sectional shape as the inner member 10 but of course is slightly larger in all directions in order that it may be telescoped over the member 10. Thus the flanges 24 and 26 of the outer member 12 are not crimped tightly upon themselves, but are left sufficiently open to receive the flanges 14 and 16 respectively of the inner telescoping member 10. The outer member 12 is provided with a track slot 28 formed by folding the edges 30 and 32 back upon themselves as described above in connection with the inner telescoping member 10. The track slot 28 is formed in the member 12 so as to lie in the same horizontal plane as the track slot 18 when the members 10 and 12 are telescoped as shown in Fig. 2. The track slot 28 however, is offset from the track slot 18 so that they lie in separate vertical planes as clearly shown in Figs. 2 and 3.

Since each telescoping section 10 and 12 has a length at least more than one-half the width of the opening at which they may be used, they will provide smooth, continuous tracks devoid of joints and extending beyond the center of the opening in each direction. Thus, if each half of a pair of draperies is supported by suitable slides on one of the tracks 18 or 28, they may be extended to meet in the center of the window with each set of slides operating on its own track. To this end the slides must be so constructed that the slides on one track will clear the other track in the zone wherein the tracks overlap. Suitable slides are illustrated herein as a part of the present invention.

The slides for the inner telescoping member 10 may be constructed as shown in detail in Fig. 2. As shown therein the slides comprise bodies 40 moulded from nylon, ethyl cellulose or similar material adapted to ride smoothly and quietly along the track slot 18 without need for lubrication. Each of the bodies 40 is provided with grooves 42 and 44 which receive the rounded edges of the track slot 18 and with a lateral extension 46 which is of sufficient length to project through the track slot 28 without contact therewith in the zone of overlap of the members 10 and 12. An enlarged head 48 may be found at the outer end of the latest extension 46. A shouldered rivet 50 extends through a suitable opening formed in the body 40 and lateral extension 46. The head 52 of the rivet 50 is positioned on the inner side of the slide body 40 while the shoulder (not numbered) projects slightly beyond the outer surface of the enlarged head 48. A drapery hanger 54 may be secured against the shoulder by flaring the outer end 56 of the rivet 50 in the usual manner. The body of the rivet is free to rotate within the slide body 40 and the drapery hanger is thus supported for pivotal movement relative to the slide body without danger of sagging into engagement with the outer track slot 28. The drapery hanger 54 is preferably offset as at 58 so that the lower end 60 thereof may lie directly beneath the track slot 18 as clearly shown in Fig. 2. An opening 62 may be formed in the lower end 60 of the hanger 54 to receive a drapery hook (not shown) by which a drapery may be supported.

Slides suitable for use on the outer telescoping member 12 may be constructed as shown in detail in Fig. 3. As shown therein each of the slides comprises a body 64 preferably moulded from a material similar to that described above in connection with the slide bodies 40 and provided with grooves 66 and 68 to receive the rounded edges of the track slot 28. A rivet 70 is rotatably carried by the slide body 64 and has secured at its outer shouldered end 72 a drapery hanger 74 offset at 76 to position the lower end thereof beneath the track slot 28. An opening 80 is provided to receive a drapery hook (not shown).

In Fig. 1, the slides indicated generally by the reference characters A and B are arranged to ride in the track slot 18 formed in the inner telescoping member 10 and to carry the left-hand half of the pair of draperies (when viewed from the rear as in Fig. 1) while those indicated at C, and D and E will carry the right-hand half. When the draperies are closed the assemblies B and C will meet at the center of the traverse rod as shown in the drawings. However, it will be understood that special slides, called master slides, will usually be provided. These master slides (not shown) ordinarily include overlapping extensions to which the inner edges of the drapery may be attached so that the inner edges will overlap at the center of the window when the draperies are closed. Obviously, the halves may be of any suitable width and any appropriate number of hanger and slide assemblies may be provided for each half. It is important only that the slides for each half all be positioned within the same track so that a perfectly smooth and unbroken path of travel will be provided for the slides as they move from the fully extended (or closed) position illustrated in Fig. 1 to a collapsed (or open) position toward the respective opposite ends of the telescoping members 10 and 12.

The advantages of the structure just described are several. The principal advantage is that a telescopically adjustable traverse rod is provided which has independent, smooth and unbroken tracks for each set of slides. Each track extends from an end to a point beyond the center of the rod in any position of adjustment. Thus the track slides are not required to encounter any joint or overlapped edges or the like in any portion of their path of travel.

I claim:

1. In a drapery traverse rod of the extension type the combination of an outer telescoping rod member, an inner telescoping rod member adapted to be received within said outer member, means on said outer member forming a track extending longitudinally and substantially the full length of said outer member, and means on said inner member forming a track extending longitudinally and substantially the full length of said inner member, said tracks being so positioned on said members respectively as to lie out of longitudinal alignment when said members are assembled in telescoped relationship whereby portions of said tracks overlap in spaced parallel relationship.

2. In a drapery traverse rod of the extension type the combination of an outer telescoping rod member, an inner telescoping rod member adapted to be received within said outer member, means on said outer member forming a track extending longitudinally and substantially the full length of said outer member, means on said inner member forming a track extending longitudinally and substantially the full length of said inner member, said tracks being so positioned on said members respectively as to lie out of longitudinal alignment when said members are assembled in telescoped relationship whereby portions of said tracks overlap in spaced parallel relationship, and a plurality of drapery holders mounted for movement on each track.

3. In a drapery traverse rod of the extension type the combination of an outer telescoping rod member, an inner telescoping rod member adapted to be received within said outer member, means on said outer member forming a track extending longitudinally and substantially the full length of said outer member, and means on said inner member forming a track extending longitudinally and substantially the full length of said inner member, said tracks being so positioned on said members respectively as to lie in the same horizontal plane but in different vertical planes when said members are assembled in telescoped relationship whereby portions of said tracks overlap in horizontally spaced parallel relationship.

4. In a drapery traverse rod of the extension type the combination of an outer telescoping rod member, an inner telescoping rod member adapted to be received within said outer member, means on said outer member forming a track extending longitudinally and substantially the full length of said outer member, means on said inner member forming a track extending longitudinally and substantially the full length of said inner member, said tracks being so positioned on said members respectively as to lie in the same horizontal plane but in different vertical planes when said members are assembled in telescoped relationship whereby portions of said tracks overlap in horizontally spaced parallel relationship, and a plurality of drapery holders mounted for movement on each track.

References Cited in the file of this patent

UNITED STATES PATENTS

| Number | Name | Date |
|---|---|---|
| 1,942,712 | Kirsch | Jan. 9, 1934 |
| 2,222,229 | Kahler | Nov. 19, 1940 |
| 2,627,625 | Kunath | Feb. 10, 1953 |

FOREIGN PATENTS

| Number | Country | Date |
|---|---|---|
| 553,553 | Germany | June 27, 1932 |